Patented Sept. 19, 1933

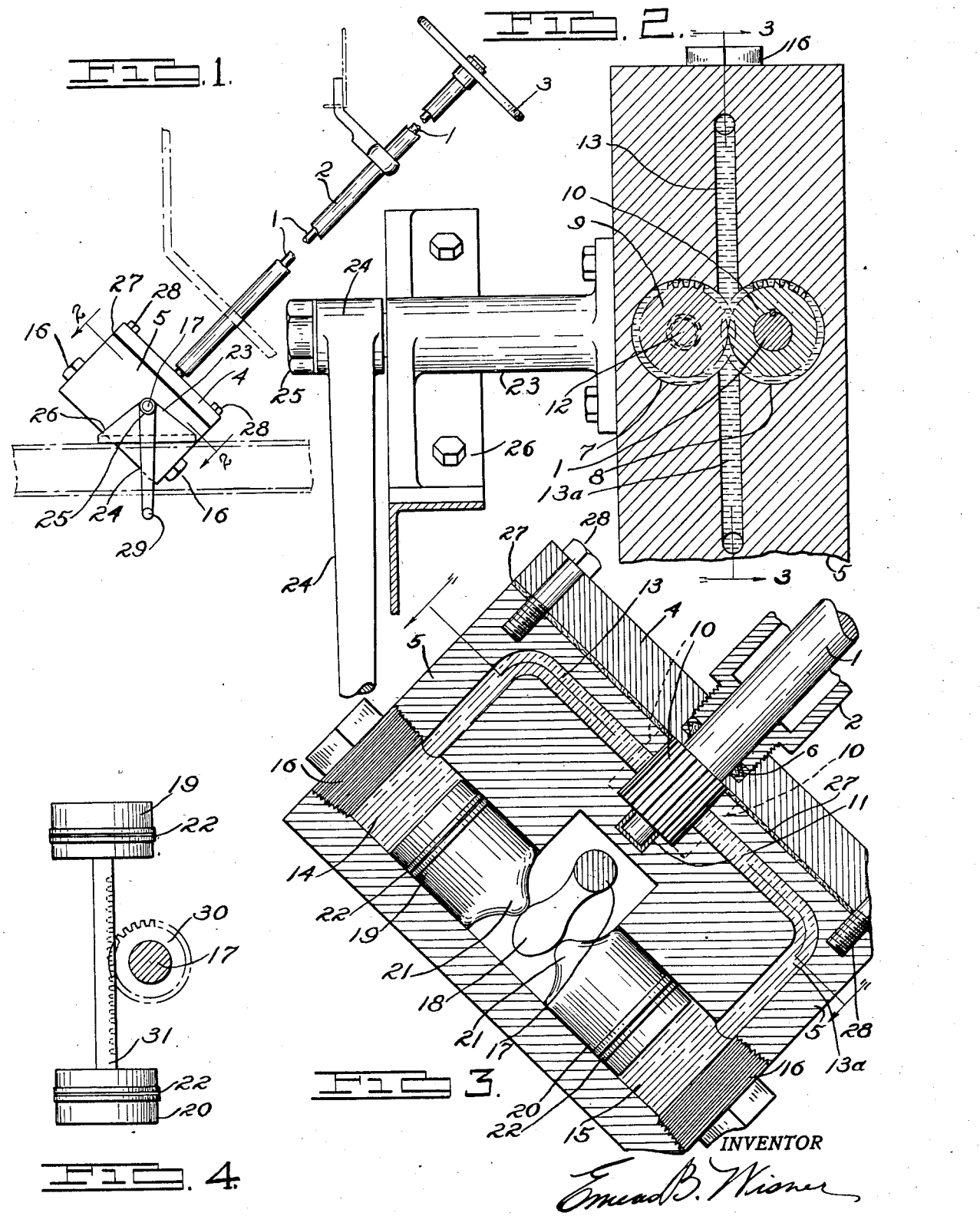

1,927,580

UNITED STATES PATENT OFFICE 1,927,580

HYDRAULIC STEERING GEAR

Emens B. Wisner, Detroit, Mich.

Application December 28, 1929
Serial No. 417,117

2 Claims. (Cl. 60—54.5)

This invention relates to steering gears for automobiles, and the object of the invention is to provide a hydraulically operated means for steering an automobile.

Another object of the invention is to provide a steering device arranged to prevent road shocks from being transmitted to the steering wheel.

A further object of the invention is to provide a hydraulic pump operated by turning of the steering wheel of the automobile in either direction and arranged to turn the forward wheels of the automobile in relation to the turning movement of the steering wheel.

Another object of the invention is to provide a hydraulic steering gear in which the connection between the steering shaft and the forward wheels of the automobile is entirely hydraulic so that any shock to the forward wheels of the automobile cannot be transmitted through the steering mechanism to the driver of the automobile.

A further object of the invention is to provide a steering means including a hydraulic pump driven by the steering shaft of the automobile in either direction according to the direction of rotation of the steering shaft.

These objects and the several novel features of the invention are hereinafter more fully described and claimed and the preferred form of construction by which these objects are attained is shown in the accompanying drawing in which—

Fig. 1 is a side elevation of a hydraulic steering gear embodying my invention.

Fig. 2 is an enlarged section taken on line 2—2 of Fig. 1.

Fig. 3 is a section taken on line 3—3 of Fig. 2.

Fig. 4 is a view of an alternative form of hydraulically actuated member.

The device comprises a steering shaft 1 shown in Figs. 1, 2 and 3 which is rotatably mounted in a steering column 2 and is provided with a steering wheel 3 secured to the upper end thereof as shown in Fig. 1. The steering shaft 1 extends through the cover plate 4 of the housing 5 as shown in Fig. 3 and the steering column 2 is also threaded into the cover plate 4 to force the packing 6 to engage and pack the steering shaft 1.

The housing 5 is provided in the top surface thereof with a pair of recesses 7 and 8 for the pump gears 9 and 10 as shown in Figs. 2 and 3. The gear 10 is secured to the end of the steering shaft 1 and is piloted in a bushing 11 as shown in Fig. 3. The gear 9 is provided with stud shafts 12 on opposite sides thereof which are similarly piloted in the housing 5 and cover 4, though not here shown. The gear 9 meshes with the gear 10 and these gears intermesh in the channels 13 and 13a, of the housing 5 as shown in Fig. 2. At one end the conduit 13 leads to a cylinder 14 and at the opposite end the conduit 13a leads to a cylinder 15. These cylinders 14 and 15 are formed by boring straight through the block or housing 5 and closing each end with a plug 16.

A shaft 17 is rotatably mounted in the housing 5 and is provided with a short arm 18 at the end extending down into the cylinder bore. A piston 19 is mounted in the cylinder 14, while a piston 20 is mounted in the cylinder 15. Each piston is provided with a rounded end 21 riding in contact with the arm 18 and each piston is provided with a piston ring 22 fitting the cylinder wall.

The outer end of the shaft 17 extends through a bracket 23 which is secured to the housing wall as shown in Fig. 2. A gasket is preferably mounted between the bracket 23 and the housing 5 to prevent leakage of the hydraulic medium and the shaft 17 is also preferably provided with a packing to prevent leakage along the shaft, though not here shown. The terminal end of the shaft is preferably splined to receive the steering arm 24 and is threaded at the end to receive the nut 25. The bracket 23 is also provided with a flange 26 by which it may be attached to the automobile chassis as shown in Fig. 1.

The gears 9 and 10 are positioned in the recesses 7 and 8 provided therefor in the housing 5 and closely fit their respective recesses. A gasket 27 is provided between the housing 5 and cover 4 and the cover 4 closely fits the upper faces of the gears 9 and 10. The cover 4 is secured to the housing 5 by the machine screws 28 and the conduits 13 and 13a, cylinders 14 and 15 and the teeth of the gears 9 and 10 are filled with a hydraulic medium such as ice machine oil whose viscosity varies only slightly under normal temperature variations.

With the system filled with oil the device is ready for operation. As will be understood from Fig. 2 rotation of the steering shaft 1 in a clockwise direction will produce a similar rotation of the gear 10. As this gear 10 meshes with the gear 9, the gear 9 will be rotated in a counter clockwise direction. This causes the teeth of the gears 9 and 10 to pick up oil from the conduit 13 between the teeth thereof which is carried about the peripheries of the gears 9 and 10 by their rotation until the teeth come into mesh again in the end of the conduit 13a. As the teeth move into mesh the oil is forced out from between the teeth into the conduit 13a. This forces the oil through the conduit 13a into the cylinder 15 thus forcing the piston 20 upwardly from the position shown in Fig. 3. By its engagement with the arm 18 the piston 20 turns the arm 18 upwardly thus moving the piston 19 upwardly to compensate for the oil withdrawn from the conduit 13.

If the steering shaft and gear 10 are rotated in a counter clockwise direction the operation is reversed. Under this condition oil is withdrawn from the conduit 13a and is forced into the conduit 13 thus forcing the pistons 19 and 20 and arm 18 downwardly to turn the steering arm 24 in the opposite direction. The steering arm 24 is provided with a terminal ball end 29 shown in Fig. 1 which is usually connected by a pitman rod or drag link for turning the forward wheels of the automobile, though not here shown.

It will be noted that there is no connection between the steering arm shaft 18 and the steering wheel shaft 1 except by the hydraulic medium and therefore any shocks imparted to the forward wheels of the automobile or to the steering arm 18 cannot be transmitted to the steering shaft or to the steering wheel 3. As will be noted from Fig. 2 even though the oil is under a tremendous pressure in the conduit 13 or 13a from an imparted shock, it cannot turn the gears 9 and 10 as the very turning of the gears under this pressure would tend to produce a greater back pressure by forcing more oil into the same conduit. At the same time the steering action is flexible and smooth and the forward wheels of the automobile are held very firmly.

An alternative form of the device is shown in Fig. 4 in which a gear 30 is secured to the shaft 17 and the pistons 19 and 20 are connected by a piston rod 31. This piston rod 31 is toothed to provide a rack so that movement of the pistons 19 and 20 in either direction turns the gear 30, shaft 17 and steering arm 24. In either form a slight leakage of oil past the pistons will do no harm as the oil between the pistons will readily travel with the pistons in either direction.

From the foregoing description it becomes evident that the device is very simple and efficient in operation, is very positive in action, will prevent the transmission of road shocks to the steering wheel and provides a device which accomplishes the objects described.

Having thus fully described my invention, its utility and mode of operation, what I claim and desire to secure by Letters Patent of the United States is—

1. In a hydraulic steering gear, a housing, a gear pump within the housing, a steering shaft for rotating the gear pump in either direction, a cylinder formed in the housing, a pair of pistons movable longitudinally of the cylinder, the housing being formed to provide conduits from the gear pump to each end of the cylinder, a shaft rotatably mounted in the housing, a cam on the shaft extending between the pistons whereby movement of the pistons in one direction turns the shaft in one direction and movement of the pistons in the other direction turns the shaft in the opposite direction, a bracket secured to the housing and providing a support therefor, the said shaft extending through the bracket and being rotatably mounted therein, the end of the shaft extending from said bracket and a steering arm secured to the extending end of the shaft.

2. In a hydraulic steering gear, a one piece housing having a cover, a pair of gears meshing together and rotatably mounted in the housing to provide a gear pump, a steering shaft secured to one of said gears and rotatably mounted in the housing cover, a cylinder extending through the housing, a closure for each end of the cylinder, a conduit formed in the housing and leading from one side of the gear pump to one end of the cylinder, a second conduit formed in the housing and leading from the other side of the gear pump to the other end of the cylinder, a pair of pistons movable in either direction longitudinally of the cylinder, a shaft rotatably mounted in the housing, a cam on the shaft extending between the pistons, a supporting bracket for the housing, the shaft extending from the housing and through the supporting bracket and a steering arm secured to the extending end of the shaft.

EMENS B. WISNER.